UNITED STATES PATENT OFFICE.

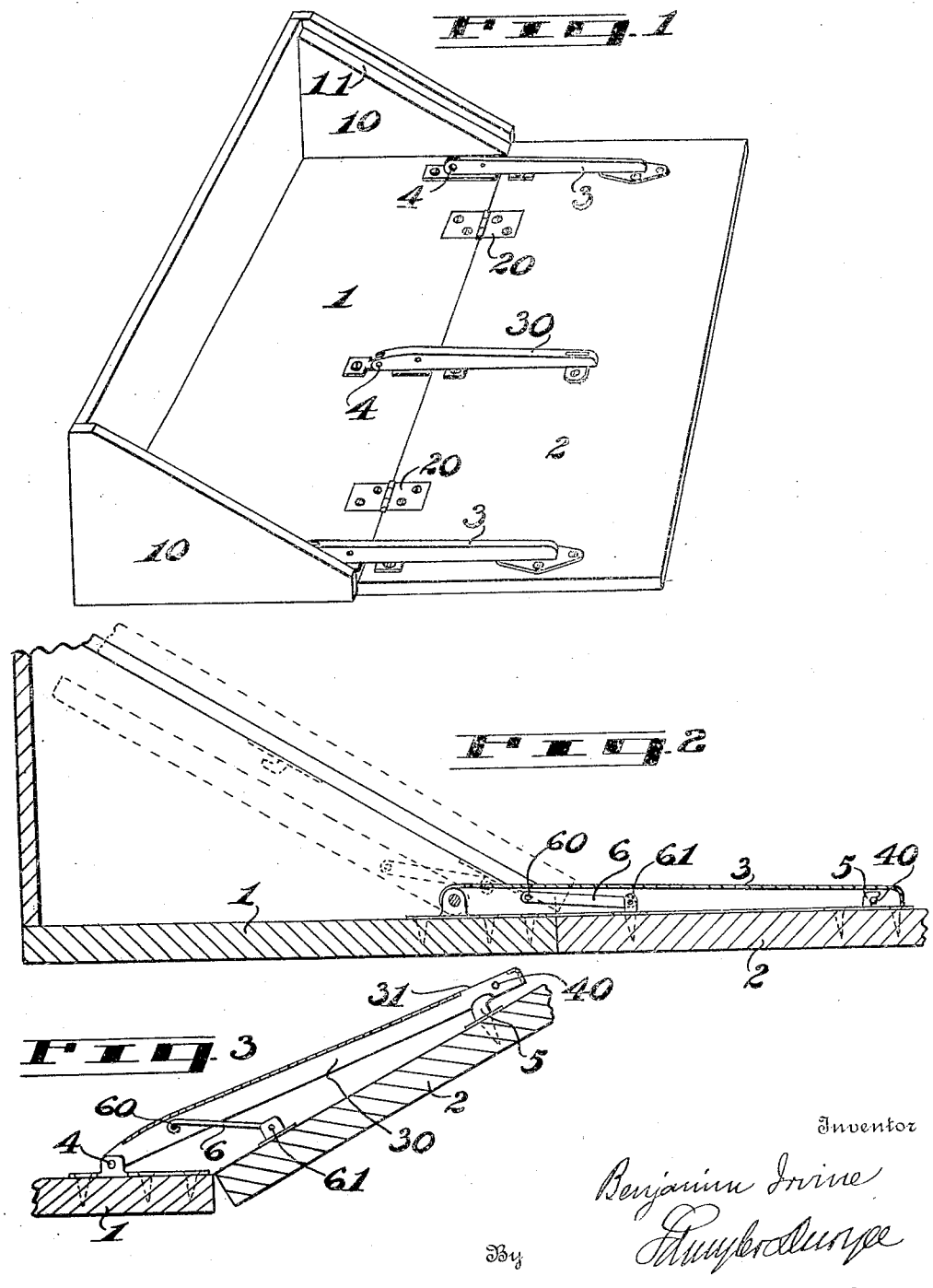

BENJAMIN IRVINE, OF EVERETT, WASHINGTON.

LEAF-SUPPORTING MECHANISM.

1,350,503.  Specification of Letters Patent.  Patented Aug. 24, 1920.

Application filed April 12, 1920. Serial No. 373,374.

*To all whom it may concern:*

Be it known that I, BENJAMIN IRVINE, a citizen of the United States, residing at Everett, in the county of Snohomish and State of Washington, have invented a new and useful Improvement in Leaf-Supporting Mechanism, of which the following is a specification.

My invention relates to an improvement in means for supporting hinged leaves from the surface when opened out.

The object of my invention is to provide a means employing a bar which may be used for supporting a hinged leaf when the same is opened out and the operation of which is automatic and yet permits ready folding of the leaf when desired.

The features of my invention which I consider to be new and upon which I desire to secure a patent will be definitely defined in the claims terminating this specification and the construction of the device as illustrated in the accompanying drawings will be herein described.

Figure 1 shows in perspective, the manner of constructing my device and applying the same to a hinged leaf.

Fig. 2 is a transverse section through the device as shown in Fig. 1.

Fig. 3 is a section showing the leaf and the connecting bar in the position assumed shortly before reaching the outer or opened position of the leaf.

In the drawings 1 represents a top of a table, desk or other like article of furniture and 2 a leaf which is hinged to said top and which is designed to be swung between the opened and closed position. In the device as herein shown, side walls 10 are indicated, these representing what may be considered the side walls of a desk. The leaf 2 when folded, rests upon shoulders, as 11, formed just within the side walls 10.

The leaf 2 is secured as by hinges 20, to the top 1 so as to swing thereon. As shown in Fig. 1 three bars 3 and 30 are shown. The bar 30 is similar to the bars 3, excepting for a slight difference in the details of its construction. The principles embodied in each of these bars are the same. The bars 3 and 30 as herein shown are supposed to be of a U-shaped cross-section opening downwardly. They are hinged, as at 4, to the top 1. At their outer ends they are each provided with a transversely extending pin, as 40. The leaf 2 is provided with a hook, as 5, which projects slightly from the upper surface of the leaf and faces outwardly, or away from the pivot axis of the leaf. This hook is so located with reference to the transverse pin 40 that, as the leaf approaches near to its full opened position, or that shown in Fig. 2, and the bar 3 is swung under the influence of a link 6 which is pivotally connected to the bar, as at 60, and to the leaf as at 61, the pin 40 will first be swung over or clear of the outer point of the hook and the pin 40 will be drawn under the hook, or to the position shown in Fig. 2, as the leaf reaches its final position.

In this position the bar 3 or 30 as the case may be, rests upon the table top at the edge to which the leaf is hinged, and its inner end is anchored to the table by its pivotal connection at 4. The bar, therefore, forms a supplemental support for the leaf.

As many of these bars may be mounted upon the leaf as desired. While I have shown 3 such bars, it is evident that a single bar located at the center in the position shown by the bar 30, may suffice for some purposes. Also that at times two bars located in the ends of the leaf, as the bars 3, may better fill the requirements.

The bar 30 is like the bar 3 excepting that at its outer end it is cut through on its upper surface, forming an opening 31 which permits the retaining hook 5 to either project through or into the same, and thus makes it possible to reduce the vertical thickness of the supporting bar at these points. The point at which the link 6 is pivoted to the bar and to the leaf, will depend upon the length of the links 6 and the distance between these pivot points and the pivot axis of the leaf. These should be so placed with reference to the length of the bar and the position of the locking hook 5, as to secure engagement of the transverse pin 40 with this hook as the leaf reaches its fully opened position.

What I claim as my invention is:—

1. A support for a hinged leaf comprising a bar hinged inwardly of the hinge axis of the leaf, a link pivotally connecting the leaf and the bar outwardly of their pivots, and a hook carried by the leaf and adapted to be lockingly engaged with the outer end of the bar as it reaches its fully opened position.

2. A support for a hinged leaf comprising a bar hinged at the upper side of the base to which the leaf is hinged and inwardly of the hinge axis, a link pivotally connecting the leaf with the bar outwardly from their hinge points, a hook at the upper side of the leaf and facing away from the leaf hinge, and a transversely extending pin across the outer end of the bar and adapted to be drawn under said hook as the leaf reaches its fully open position.

3. A support for a hinged leaf comprising a bar hinged at the upper side of the base to which the leaf is hinged and inwardly of the hinge axis, a link pivotally connecting the leaf with the bar outwardly from their hinge points, and means whereby the outer end of said bar and the leaf are brought into interlocking engagement by relative angular positions of the parts, as the leaf approaches its opened position.

4. A support for a hinged leaf comprising a bar hinged to the upper side of a table inward from the hinge axis of the leaf and adapted to extend over the leaf when opened, and means operated by the opening swing of the leaf to lockingly engage the other end of the bar with the leaf as it reaches its fully opened position and is disengaged therefrom as it is swung toward closing position.

5. A support for a hinged leaf comprising a bar hinged to a table inwardly from the leaf hinges and having a transversely extending catch, at its outer end, a hook carried by the leaf and facing away from the leaf hinges and positioned to be engaged by the catch of said bar when the leaf is fully opened.

BENJAMIN IRVINE.